(12) United States Patent
Ariga

(10) Patent No.: US 7,414,658 B2
(45) Date of Patent: Aug. 19, 2008

(54) IMAGING APPARATUS INCLUDING MONITOR FOR DISPLAYING OBJECT IMAGE BASED ON IMAGE DATA, METHOD OF CONTROLLING THE SAME, AND RECORDING MEDIUM HAVING RECORDED THEREON COMPUTER-READABLE PROGRAM CODE FOR CONTROLLING IMAGING APPARATUS

(75) Inventor: Kazuto Ariga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 763 days.

(21) Appl. No.: 10/724,601

(22) Filed: Dec. 2, 2003

(65) Prior Publication Data

US 2004/0117729 A1 Jun. 17, 2004

(30) Foreign Application Priority Data

Dec. 11, 2002 (JP) ............................. 2002-359653

(51) Int. Cl.
 *H04N 5/222* (2006.01)
(52) U.S. Cl. ............................. 348/333.11; 348/231.3
(58) Field of Classification Search ............ 348/333.02, 348/333.05, 333.11, 333.12, 362, 363, 364, 348/231.9, 231.3, 333.04; 396/311; 702/150
See application file for complete search history.

(56) References Cited

U.S. PATENT DOCUMENTS

| 6,233,015 | B1 * | 5/2001 | Miller et al. | ............ | 348/333.05 |
| 6,252,625 | B1 * | 6/2001 | Hibino et al. | .............. | 348/96 |
| 6,310,648 | B1 * | 10/2001 | Miller et al. | ............ | 348/333.05 |
| 6,515,704 | B1 * | 2/2003 | Sato | ...................... | 348/333.11 |
| 6,516,154 | B1 * | 2/2003 | Parulski et al. | ............... | 396/287 |
| 6,522,354 | B1 * | 2/2003 | Kawamura et al. | ....... | 348/231.2 |
| 6,734,909 | B1 * | 5/2004 | Terane et al. | ........... | 348/333.05 |
| 6,829,009 | B2 * | 12/2004 | Sugimoto | .............. | 348/333.02 |
| 6,879,342 | B1 * | 4/2005 | Miller et al. | ........... | 348/333.05 |
| 6,930,718 | B2 * | 8/2005 | Parulski et al. | ......... | 348/333.11 |
| 7,053,951 | B2 * | 5/2006 | Miller et al. | ........... | 348/333.05 |
| 7,098,946 | B1 * | 8/2006 | Koseki et al. | ............ | 348/229.1 |
| 7,119,818 | B2 * | 10/2006 | Takiguchi | ................... | 715/764 |
| 7,184,082 | B2 * | 2/2007 | Yokokawa | ............... | 348/231.2 |
| 2003/0058344 | A1 * | 3/2003 | Mino | ...................... | 348/207.1 |
| 2003/0095192 | A1 * | 5/2003 | Horiuchi | ................... | 348/222.1 |
| 2003/0147634 | A1 | 8/2003 | Takezawa et al. | ........... | 386/117 |
| 2004/0201741 | A1 * | 10/2004 | Ban | ........................ | 348/231.3 |

FOREIGN PATENT DOCUMENTS

| CN | 1246766 A | 3/2000 |
| EP | 0 971 529 | 12/2000 |
| JP | 10-285445 | 10/1998 |
| JP | 2000-032321 | 1/2000 |

* cited by examiner

*Primary Examiner*—Lin Ye
*Assistant Examiner*—Amy Hsu
(74) *Attorney, Agent, or Firm*—Fitzpatrick, Cella, Harper & Scinto

(57) ABSTRACT

In an imaging apparatus in which a plurality of sample images are stored, image data acquired by an imaging unit and a sample image used during imaging are displayed simultaneously on a monitor. Thus, a user is allowed to know a directory where image data is to be saved while imaging an object. Furthermore, operation of the imaging unit can be set based on data associated with the sample image. Accordingly, even a user who is not accustomed to operating the imaging apparatus is allowed to image an object with a setting suitable for the status of the object.

15 Claims, 9 Drawing Sheets

PLAYBACK MODE → IMAGING MODE

FIG. 5

| ID | SAMPLE IMAGE | DIRECTORY NAME | TITLE | DESCRIPTION | IMAGING CONDITION 1 | IMAGING CONDITION 2 | IMAGING CONDITION··· |
|---|---|---|---|---|---|---|---|
| 0 | cabbagewhite.jpg | 100cabb | cabbagewhite.ext | detail_cabb.txt | cond_cabb1.txt | cond_cabb2.txt | cond_cabb*.txt |
| 1 | ladybug.jpg | 100lady | ladybug.txt | detail_lady.txt | cond_lady1.txt | cond_lady2.txt | cond_lady*.txt |
| 2 | grasshopper.jpg | 100gras | grasshopper.txt | detail_gras.txt | cond_gras1.txt | cond_gras2.txt | cond_gras*.txt |
| · · · | · · · | · · · | · · · | · · · | · · · | · · · | · · · |

Table T1

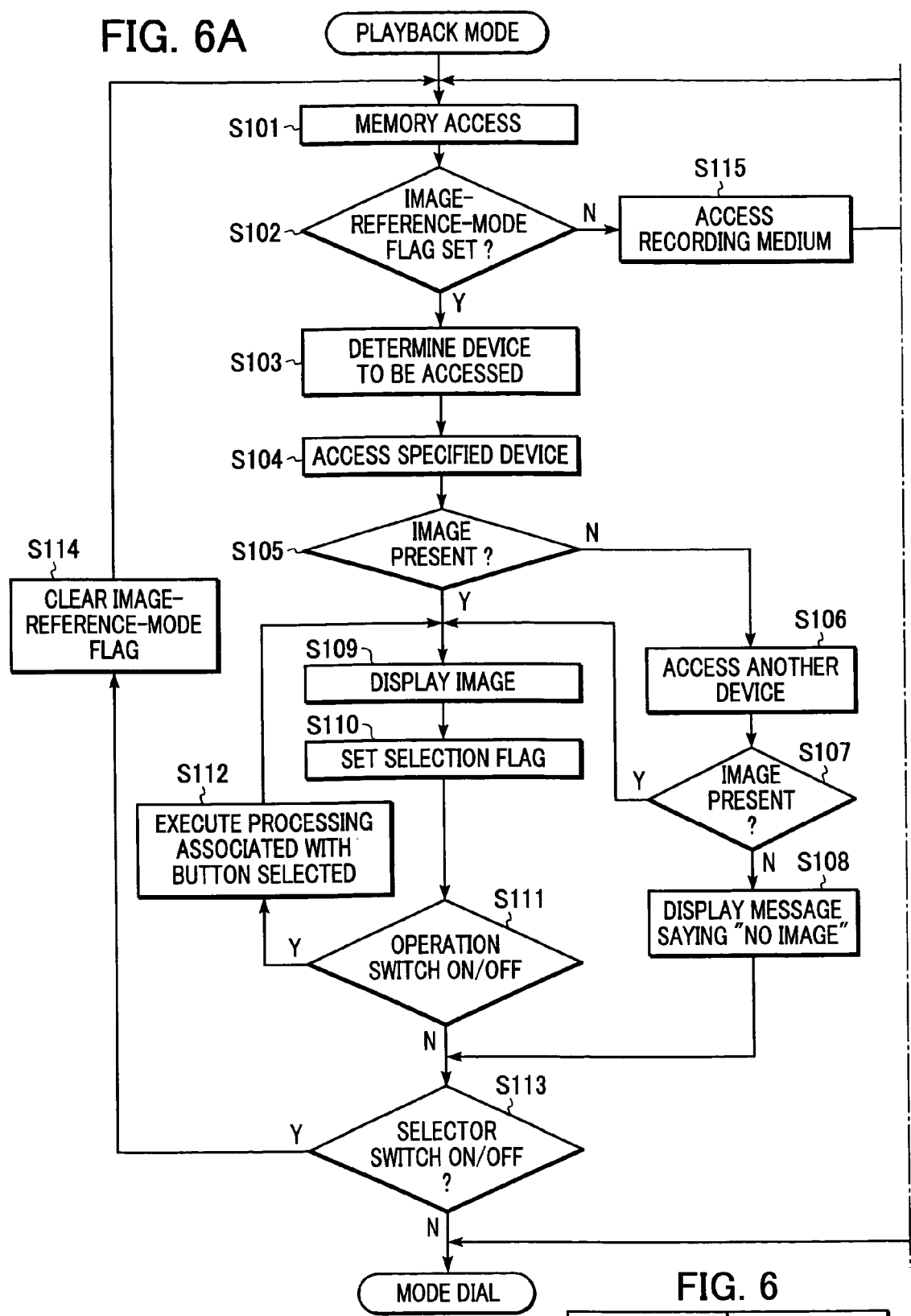

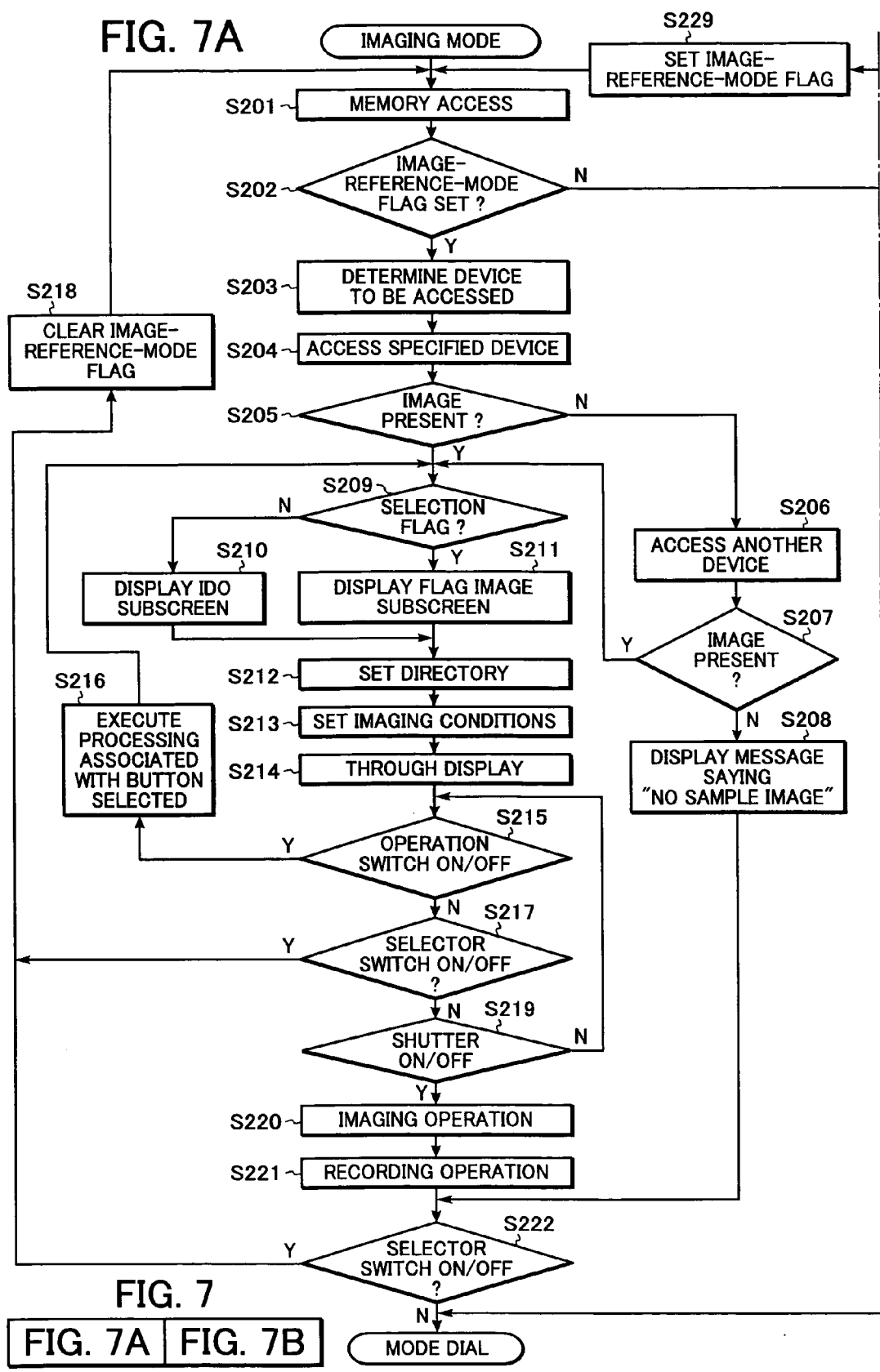

IMAGING APPARATUS INCLUDING MONITOR FOR DISPLAYING OBJECT IMAGE BASED ON IMAGE DATA, METHOD OF CONTROLLING THE SAME, AND RECORDING MEDIUM HAVING RECORDED THEREON COMPUTER-READABLE PROGRAM CODE FOR CONTROLLING IMAGING APPARATUS

BACKGROUND OF THE INVENTION

1. Field of the Invention

The present invention relates to a display such as a liquid crystal panel, and to imaging, playback of image data, and saving of image data by an imaging apparatus including a recording unit, such as a digital still camera.

2. Description of the Related Art

Imaging apparatuses such as digital still cameras that are recently becoming common have a feature that an image captured can be immediately displayed on a display, such as a liquid crystal panel, allowing a user to check the image data and to erase the image data if it is not needed. In this manner, image data captured can be organized while capturing images.

For example, Japanese Patent Laid-Open No. 10-285445 discloses an imaging apparatus in which it can be determined in advance in which directory of a recording medium image data captured is to be saved. This allows image data to be organized even before imaging.

However, even if a directory for saving is determined in advance, if a user forgets the directory when trying to capture an image, the user is required to specify a directory again.

As another example, Japanese Patent Laid-Open No. 2000-032321 discloses an imaging apparatus that is capable of automatically setting the same imaging condition (e.g., exposure value) used for capturing a sample image stored in advance in a non-volatile memory or a recording medium.

However, even if an imaging condition is set based on the sample image when imaging an object, it sometimes becomes impossible to know which sample image the imaging condition is based on when the image data recorded is played back later.

SUMMARY OF THE INVENTION

The present invention has been made in view of the considerations described above. It is an object of the present invention to provide an imaging apparatus and an imaging method in which image data can be organized more easily, and a recording medium having recorded thereon computer-readable recording program code for implementing the imaging apparatus and method.

In one aspect, the present invention provides an imaging apparatus including an imaging unit for converting an optical image into image data composed of electric signals, a monitor for displaying an object image based on the image data, a storage medium storing a plurality of sample images, and a control circuit for displaying one of the sample images and the object image simultaneously on the monitor.

In another aspect, the present invention provides an imaging apparatus including an imaging unit for converting an optical image into image data composed of electric signals, a monitor for displaying an object image based on the image data, a reader for obtaining a sample image from an external storage medium, and a control circuit for displaying the sample image and the object image simultaneously on the monitor.

In yet another aspect, the present invention provides a method of controlling an imaging apparatus. The method includes a step of converting an optical image into image data composed of electric signals, a step of displaying, on a monitor, an object image acquired by an imaging unit, a step of reading a sample image from a storage medium, and a step of displaying the sample image read from the storage medium simultaneously with the object image.

In a further aspect, the present invention provides a recording medium having recorded thereon computer-readable program code for controlling an imaging apparatus. The program code includes first computer-readable program code for converting an optical image into image data composed of electric signals, second computer-readable program code for displaying, on a monitor, an object image acquired by an imaging unit, third computer-readable program code for reading a sample image from a storage medium, and fourth computer-readable program code for displaying the sample image read from the storage medium simultaneously with the object image.

According to the present invention, image data acquired by an imaging unit and a sample image are displayed simultaneously on a monitor. Accordingly, a user is allowed to know a directory where the image data is to be saved while imaging an object.

Furthermore, in the present invention, an operation of the imaging unit can be set based on data associated with the sample image. Accordingly, even a user who is not accustomed to operating the imaging apparatus is able to image an object with a setting suitable for the status of the object.

Further objects, features and advantages of the present invention will become apparent from the following description of the preferred embodiments with reference to the attached drawings.

BRIEF DESCRIPTION OF THE DRAWINGS

FIG. 5 is a diagram showing a table that is used by the imaging apparatus shown in FIG. 1.

FIG. 6, including FIGS. 6A and 6B, is a flowchart for explaining an operation in a playback mode of the imaging apparatus shown in FIG. 1.

FIG. 7, including FIGS. 7A and 7B, is a flowchart for explaining an operation in an imaging mode of the imaging apparatus shown in FIG. 1.

DESCRIPTION OF THE PREFERRED EMBODIMENTS

Now, preferred embodiments of the present invention will be described with reference to the drawings.

Figure 1:
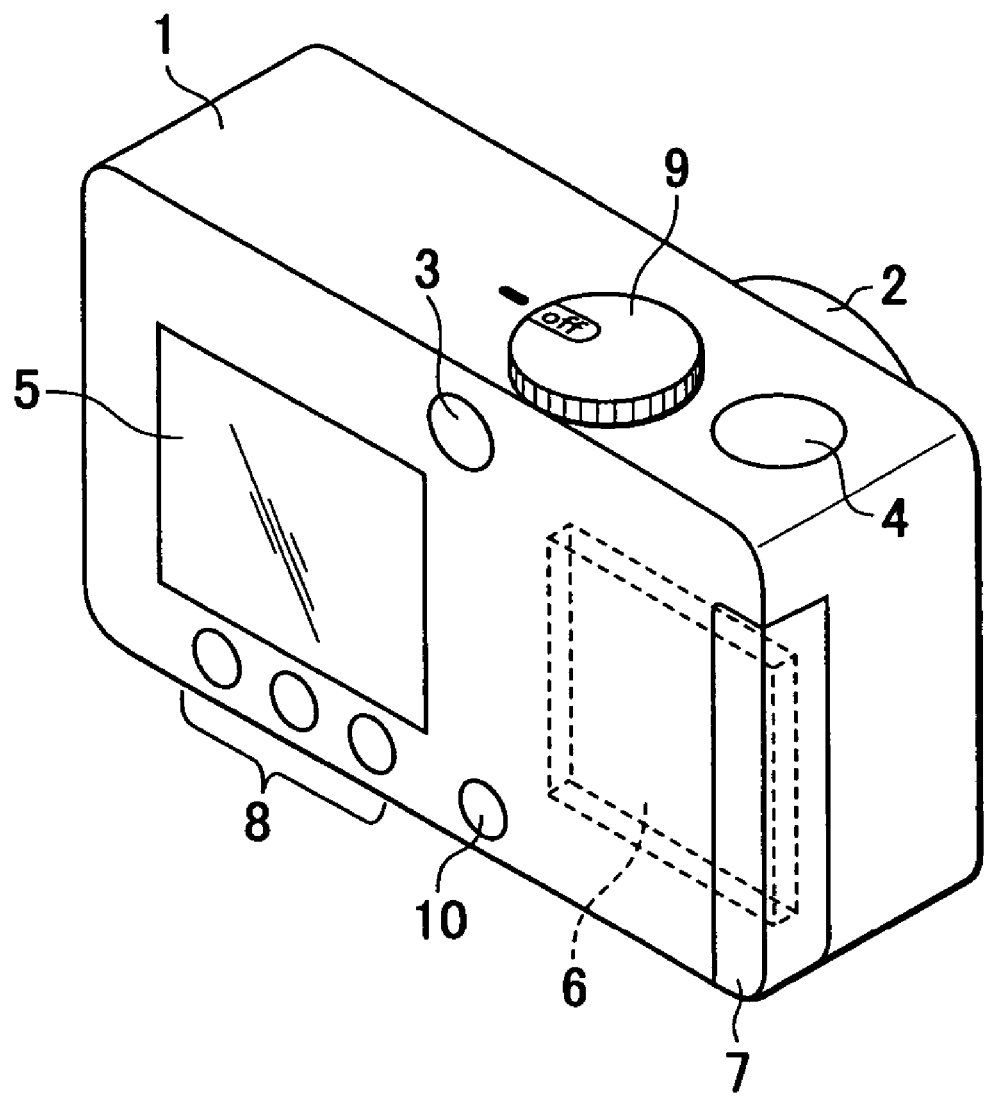
FIG. 1 is a schematic perspective view of an imaging apparatus according to an embodiment of the present invention.

FIG. 1 is a schematic perspective view of a digital still camera that is an imaging apparatus according to an embodiment of the present invention. Referring to FIG. 1, a main unit of the digital still camera 1 generally includes a solid-state imaging device, such as a CCD or CMOS device, a signal-processor substrate, a power-source substrate, a battery, a slot for containing a recording medium for recording captured image data thereon, and a recording unit for recording data on the recording medium in the slot, although these components are not explicitly shown in FIG. 1. The digital still camera has an imaging lens 2, an optical finder 3, a release button 4, a liquid crystal panel 5 that functions as a display, provided at the back of the digital still camera 1, and a card-shaped recording medium 6 that is detachable from the main unit of the digital still camera 1, contained in the slot of the digital still camera 1.

The digital still camera 1 also has a cover 7 for protecting the card-shaped recording medium 6, rotatably supported on a side surface of the digital still camera 1 by a shaft (not shown), operation switches 8 provided at the back of the digital still camera 1, a mode dial 9 for switching among plural imaging modes, and a selector switch 10 for selecting a sample-image-reference mode. These components further will be described below.

Figure 2:
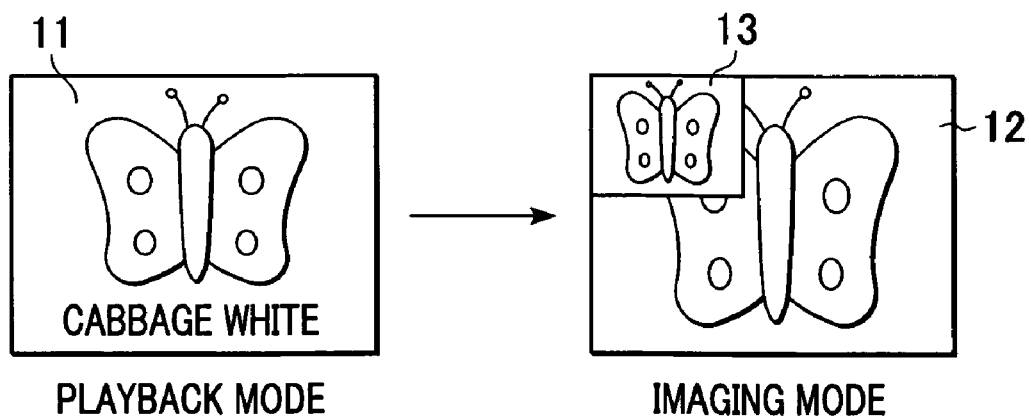
FIG. 2 is a diagram for explaining images displayed on a liquid crystal monitor of the imaging apparatus shown in FIG. 1.

FIG. 2 is a diagram for explaining images that are displayed on the liquid crystal panel 5 when a playback mode of image data is set, and when an imaging mode is set. Referring to FIG. 2, a sample image 11 that is displayed in the playback mode is stored in the card-shaped recording medium 6. Image data 12 that is displayed in the imaging mode is obtained from an output of the solid-state imaging device with input of a flux of light that has been transmitted through the imaging lens 2. A reduced image 13 is obtained by reducing the sample image 11 displayed in the playback mode, and it is simultaneously displayed with the image data 12 in the imaging mode.

Figure 3:
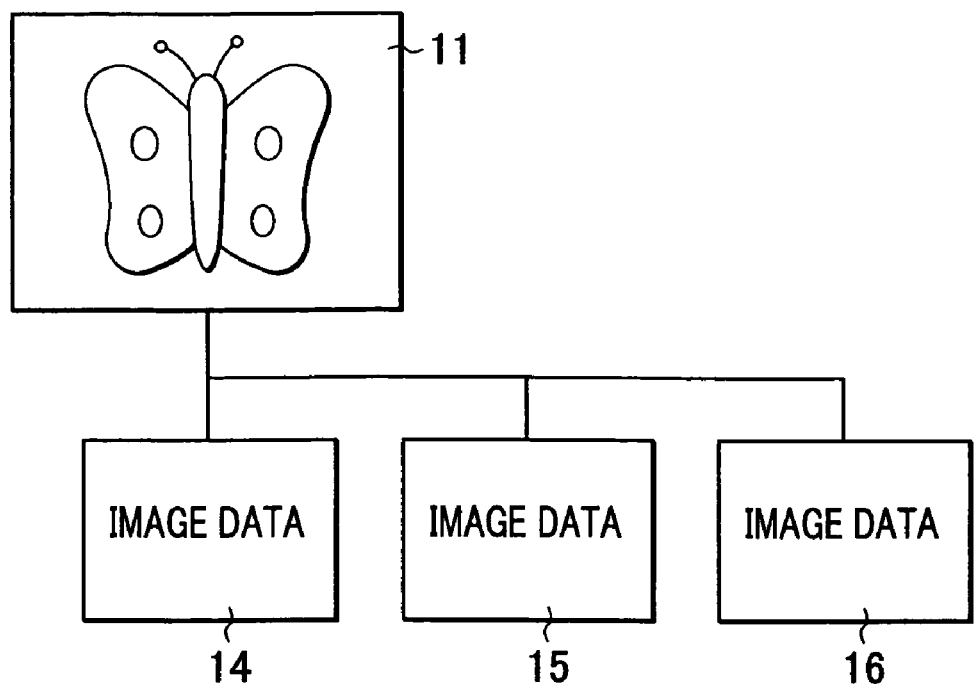
FIG. 3 is a diagram showing where image data acquired by the imaging apparatus shown in FIG. 1 is saved.

FIG. 3 is a schematic diagram for explaining relationship between image data captured to be saved and the sample image 11. Image data 14 to 16 are captured image data.

Figure 4:
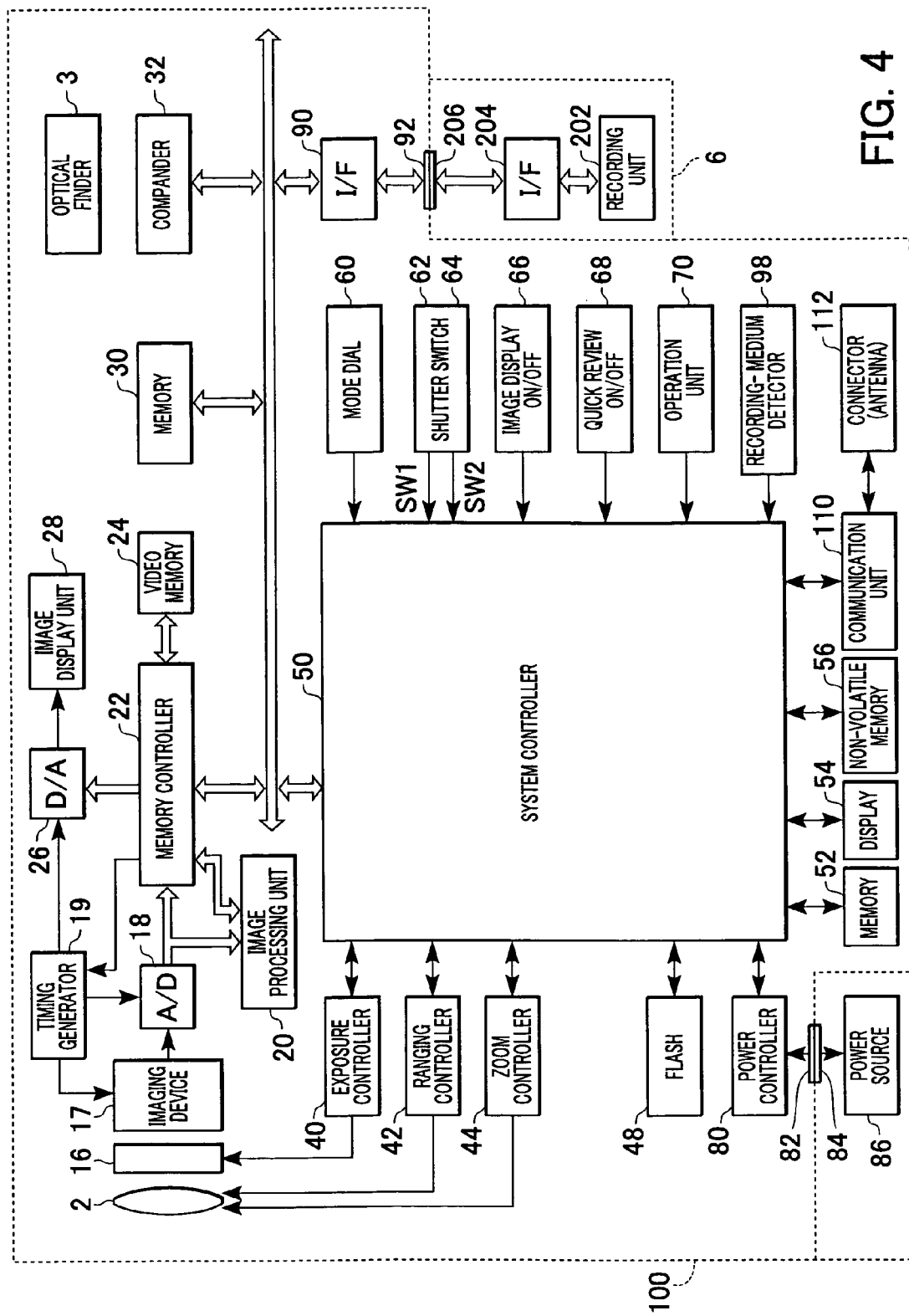
FIG. 4 is a block diagram showing the configuration of the imaging apparatus shown in FIG. 1.

FIG. 4 is a block diagram showing the configuration of the digital still camera according to this embodiment.

FIG. 5 shows a table T1 that is stored in a non-volatile memory provided in the digital still camera 1 or the card-shaped recording medium 6. In Table T1, files including directory names, titles, descriptions, and imaging conditions are associated with sample images.

Figure 6B:
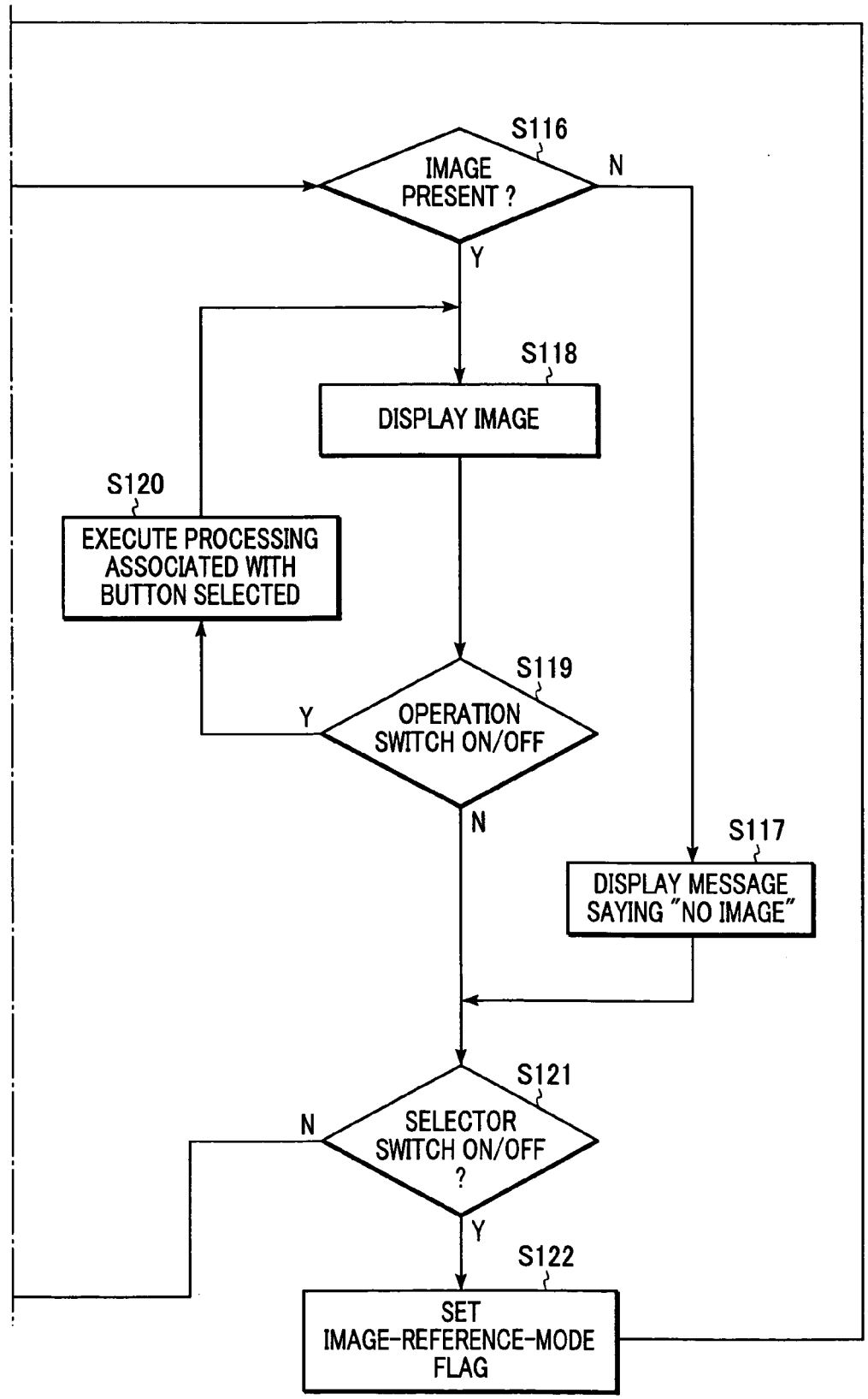

FIG. 6, including FIGS. 6A and 6B, is a flowchart for explaining an operation in the playback mode in this embodiment.

Figure 7B:
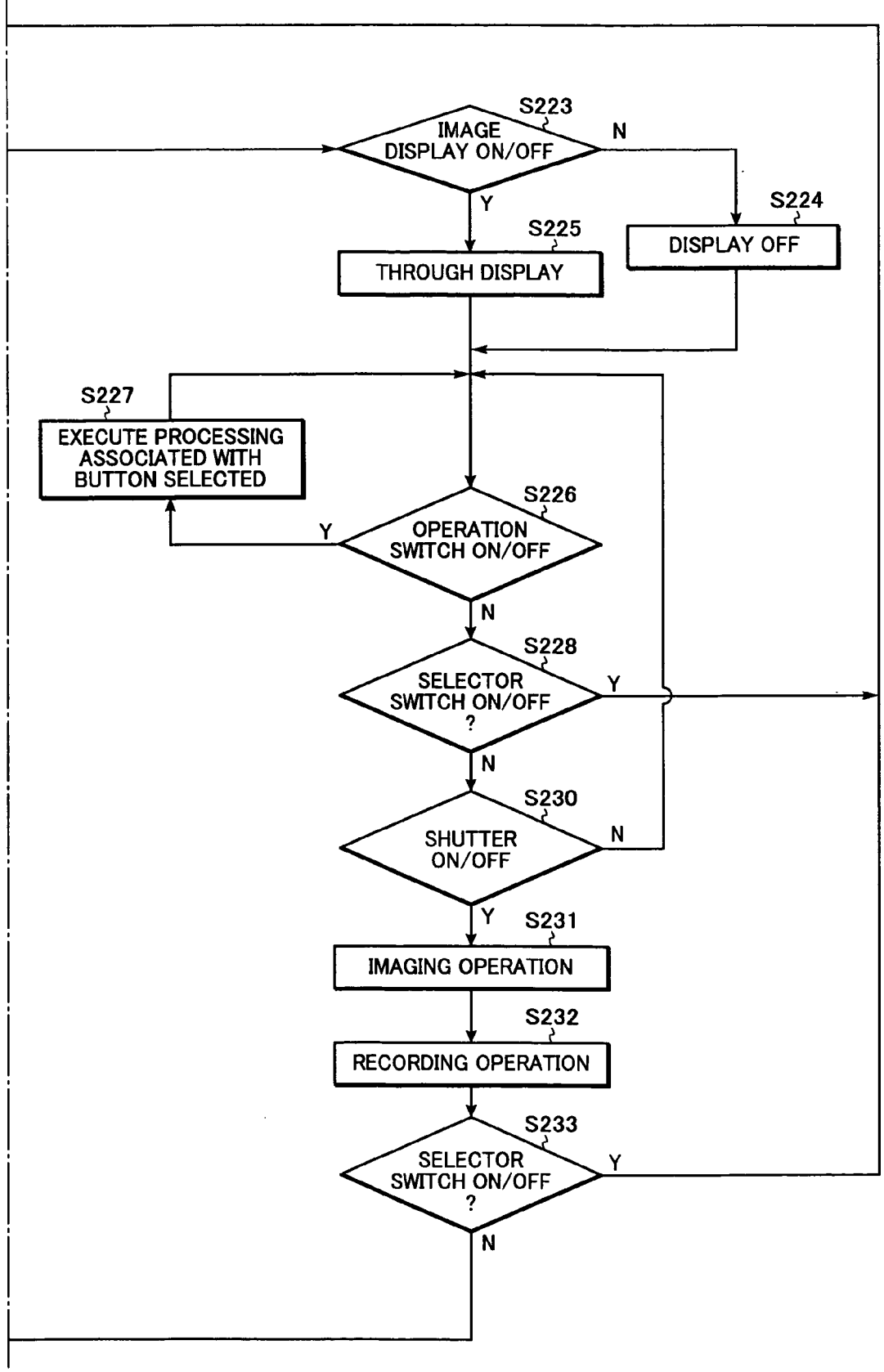

FIG. 7, including FIGS. 7A and 7B, is a flowchart for explaining an operation in the imaging mode in this embodiment.

Figure 8:
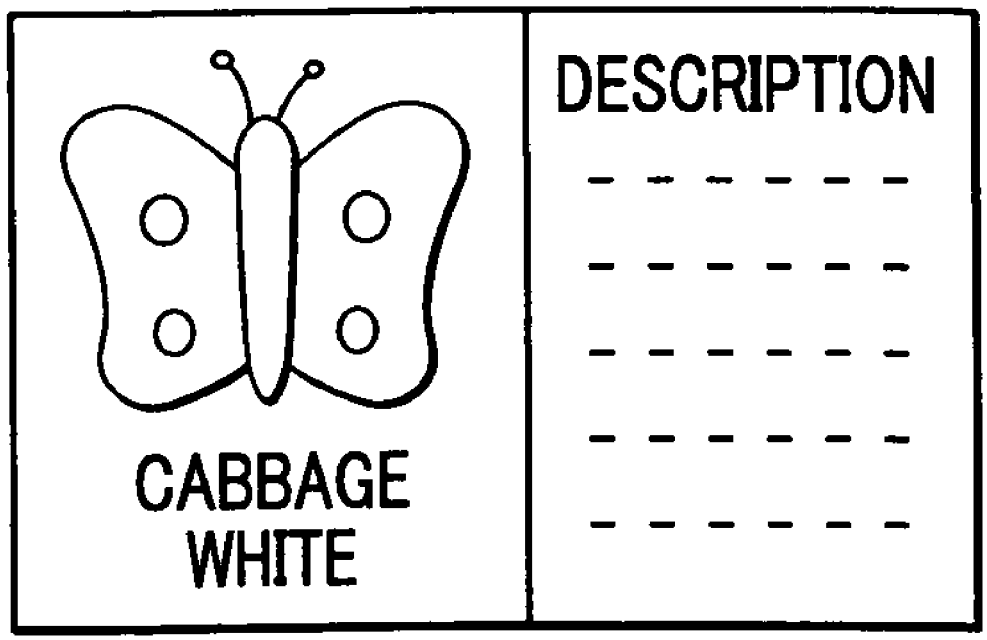
FIG. 8 is a diagram for explaining an example screen displayed in the playback mode of the imaging apparatus shown in FIG. 1.

FIG. 8 shows an example of information that is displayed on the liquid crystal panel 5 in the playback mode.

On the card-shaped recording medium 6, sample images captured by a professional cameraman, and data that associates directory names and text data with the sample images are recorded. For example, if the sample images relate to insects, such as cabbage whites, ladybugs, and grasshoppers, text data describing names, behaviors, etc., of the insects is displayed on the liquid crystal panel 5 together with the image data, as in an insect picture book. Obviously, the sample images need not relate to insects, and may relate to, for example, animals, plants, buildings, scenery, or places such as concert halls or wedding ceremony halls.

For example, if a user visits a suburban area and finds a butterfly, the user rotates the mode dial 9 provided on the digital still camera 1 to enter the playback mode, and presses the selector switch 10 to enter the sample-image-reference mode.

Then, sample images stored in the card-shaped recording medium 6 are displayed on the liquid crystal panel 5. The user sequentially displays the sample images using the operating switch 8, comparing the butterfly to be imaged with the sample images to see if a match is found. This allows the user to look up information regarding the butterfly as if using an insect picture book.

When a sample image matching the object (in this embodiment, a sample image of a cabbage white, shown on the left side of FIG. 2) is found, if the user wishes to image the object, the user rotates the mode dial 9 to switch to the imaging mode.

Then, as shown on the right side of FIG. 2, two pieces of image data are simultaneously displayed on the liquid crystal panel 5. One is image data 12 of the object image, obtained from an output of imaging devices having received a flux of light that has been transmitted through the imaging lens 2, which represents the status of the object at that time in real time. The other is a reduced sample image 13 displayed on a subscreen, obtained by reducing the sample image 11 displayed earlier in the playback mode.

When the user presses the release button 4 in this state, to execute an imaging operation by the digital still camera 1, as shown in FIG. 3, image data 14 obtained by imaging is saved under the sample image 11. When imaging is performed again using the same sample image 11, image data 15 and 16 obtained by imaging operations are also saved under the sample image 11.

As described above, the digital still camera displays a sample image in the imaging mode so that the user is allowed to recognize a directory where image data obtained by an imaging operation will be saved. Accordingly, the user is allowed to know where the image will be saved while imaging an object. In this manner, the user readily can organize image data while imaging.

Furthermore, in this embodiment, a sample image is associated, by a table T1, with a file including imaging conditions under which the sample image was captured by a professional cameraman. When a sample image is displayed in a subscreen in the imaging mode, as shown in FIG. 2, imaging conditions associated with the sample image are automatically set in the digital still camera 1. For example, when a cabbage white is imaged, a macroscopic imaging mode is selected, stroboscopic imaging is prohibited, and a relatively fast shutter speed is chosen since the object is a moving object. Furthermore, a zoom lens can be moved so that the angle will be the same as that for the sample image.

In this embodiment, the selector switch 10 is pressed to switch to the sample-image-reference mode, as described above. Conversely, when the selector switch 10 is pressed while the sample-image-reference mode is set in the playback mode, the card-shaped recording medium 6 is accessed to display an image that is not a sample.

When the selector switch 10 is pressed while the sample-image-reference mode is set as the imaging mode, the subscreen on the liquid crystal panel 5 disappears and only the object image 12 is displayed, which is saved in a normal directory after imaging. When the user wishes to image another object abruptly while a sample image is displayed, by pressing the selector switch 10 before imaging, image data captured is prevented from being saved erroneously in a folder associated with the sample image displayed.

As described above, according to this embodiment, the same imaging conditions as used to take a sample image are automatically set by the camera. Thus, even a child or a novice can readily take images at the same level as samples captured by a professional, and images can be organized.

Next, the configuration of the digital still camera according to this embodiment will be described with reference to a block diagram shown in FIG. 4.

Referring to FIG. 4, the digital still camera includes a main unit 100. The digital still camera has an imaging lens 2, a shutter 16 that functions as an aperture, a solid-state imaging device 17 for converting an optical image into an electric signal, such as a CCD or CMOS device, and an A/D converter 18 for converting an analog signal output from the solid-state imaging device 17 into a digital signal.

The digital still camera also includes a timing generator circuit 19 for supplying clock signals and control signals to the solid-state imaging device 17, the A/D converter 18, and a D/A converter 24 for converting a digital signal output into an analog signal. The timing generator circuit 19 is controlled by a memory controller circuit 22 and a system controller circuit 50. The digital still camera also includes an image processing circuit 20. The image processing circuit 20 performs predetermined interpolation and color conversion on data supplied from the A/D converter 18 or data supplied from the memory controller circuit 22.

Furthermore, the image processing circuit 20 performs predetermined processing on captured image data, and based on resulting data, the system controller circuit 50 controls an exposure controller 40 and a ranging controller 42 to perform an auto-focus (AF) process by the through-the-lens (TTL) method, an automatic exposure (AE) process, and a pre-flashing (electronic flash (EF)) process.

Furthermore, the image processing circuit 20 performs predetermined calculation using the captured image data, and based on the result of this calculation, it performs an auto white balance (AWB) process by the TTL method.

The electronic digital camera also includes the memory controller 22. The memory controller circuit 20 controls the A/D converter 18, the timing generator circuit 19, the image processing circuit 20, a video memory 24, the D/A converter 26, a memory 30, and a compander circuit 32.

Data output from the A/D converter 18 is written to the video memory 24 or the memory 30 via the image processing circuit 20 and the memory controller circuit 22, or data output from the A/D converter 18 is directly written to the video memory 24 or the memory 30 via the memory controller circuit 22. The digital still camera also includes the D/A converter 26, and an image display unit 28 implemented, for example, by a liquid crystal display (LCD) including thin-film transistors (TFTs). Image data for display, written to the video memory 24, is displayed on the image display unit 28 via the D/A converter 26.

An electronic finder function is achieved by sequentially displaying image data captured on the image display unit 28. Furthermore, the image display unit 28 is capable of turning the display ON/OFF, as instructed by the system controller circuit 50. When the display is turned off, power consumption by the imaging apparatus 100 is significantly reduced.

The digital still camera also includes the memory 30 for storing still pictures and moving pictures that have been captured. The memory 30 has a sufficient storage capacity for storing a predetermined number of still pictures or a predetermined length of moving pictures. Thus, even in cases of continuous imaging or panorama imaging, in which a plurality of still pictures is continuously taken, the memory 30 allows a large amount of data to be quickly written thereto.

Furthermore, the memory 30 can also be used as a work area for the system controller circuit 50. The compander circuit 32 compresses and expands image data, for example, by adaptive discrete cosine transform (ADCT). The compander 32 reads an image stored in the memory 30, compresses or expands the data, and writes resulting data in the memory 30.

The exposure controller 40 controls the shutter 16 that functions as an aperture, and it also controls electronic flashing in cooperation with an electronic flash 48.

The ranging controller 42 controls focusing of the imaging lens 2, and the zoom controller 44 controls zooming of the imaging lens 2.

The electronic flash 48 is also capable of emitting an auxiliary light for AF.

The exposure controller 40 and the ranging controller 42 are controlled by the TTL method. Based on a result of processing captured image data by the image processing circuit 20, the system controller circuit 50 controls the exposure controller 40 and the ranging controller 42.

The system controller circuit 50 controls the overall operation of the digital still camera 100. A memory 52 stores constants, variables, programs, etc., for operation of the system controller circuit 50. A display unit 54, including a liquid crystal display, a speaker, etc. presents text, images, sound, and the like, representing operation status, messages, and the like, in accordance with execution of programs by the system controller circuit 50. The display unit 54 may be provided at one position or at a plurality of positions in the vicinity of the operation unit, so as to be readily recognizable, and is implemented, for example, by a combination of an LCD, LED and sounding element.

Part of the functionality of the display unit 54 is implemented within the optical finder 3. Of the display unit 54, information displayed on the LCD or the like includes information relating to single-shot/continuous-shoot, self-timer, compression ratio, the number of pixels for recording, the number of pictures recorded, the remaining capacity of imaging, shutter speed, aperture value, exposure correction, flashing, red-eye reduction, macroscopic imaging, buzzer setting, remaining amount of battery for clock, remaining amount of battery, error, information in a plurality of digits, whether the card-shaped recording medium 6 is detached or connected, operation status of communication I/F, date/time, and the like.

Of the display unit 54, information displayed in the optical finder 3 includes information relating to focusing, camera-shake alert, flash charging, shutter speed, aperture value, exposure correction, and the like.

A non-volatile memory 56 is a memory that allows electrical erasing and recording, such as an EEPROM. The non-volatile memory 56 allows storage of sample images and a table for associating directory names and text data with the sample images.

Various operation units 60, 62, 64, 66, 68, and 70 allow input of various operation commands via the system controller circuit 50, and include a combination of switches, dials, touch panel, pointing devices based on viewpoint detection, voice recognition devices, and the like.

Now, the various operation units will be described briefly.

The mode dial switch 60 allows switching among various function modes, such as power off, automatic imaging mode, imaging mode, panorama imaging mode, playback mode, multiscreen playback/erasing mode, and PC connection mode.

A first shutter switch 62 is turned on in the middle of an operation of a shutter button (not shown), that is, a "first stroke", and it initiates the start of various operations, such as auto focus (AF) processing, automatic exposure (AE) processing, auto white balance (AWB) processing, and pre-flashing (electronic flash (EF)) processing.

A second shutter switch 64 is turned on when the operation of the shutter button not shown is completed, that is, the "second" as "full" stroke. The second shutter switch 64 initiates the starts of a series of processes including an exposure process, in which image data read from the imaging device 17 is written to the memory 30 via the A/D converter and the memory controller circuit 22, a developing process, including calculation in the image processing circuit 20 and the memory controller circuit 22, and a recording process, in which image data is read from the memory 30, compressed in the compander circuit 32, and written in the recording medium 6.

An ON/OFF switch 66 allows setting ON/OFF of the image display unit 28. Thus, a current is not supplied to the image display unit 28 when imaging is performed using the optical finder 3, so that power consumption is saved.

A quick review ON/OFF switch 68 is used to set a quick review function that allows captured image data to be automatically played back immediately after imaging.

An operation unit 70 includes various buttons, a touch panel, and the like. More specifically, the operation unit 70 generally includes a menu button, a set button, a macro button, a multi-screen-playback page-changing button, a flash setting button, a single-shoot/continuous-shoot/self-timer switching button, a menu moving "+" (plus) button, a menu moving "−" (minus) button, a playback-image moving "+" (plus) button, a playback-image moving "−" (minus) button, an imaging-quality selecting button, an exposure correcting button, a date/time setting button, and the like.

A power-supply controller 80 includes a battery detector circuit, a DC-DC converter, and a switching circuit for switching block to which power is supplied. The power-supply controller 80 detects the presence of a battery mounted, the type of the battery mounted, and the remaining capacity of the battery, and based on the results of such detection and instructions from the system controller circuit 50, it controls the DC-DC converter to supply a voltage for a period as required to the blocks including the recording medium.

The digital still camera also has connectors 82 and 84, and a power source 86, for example, a primary battery such as an alkaline battery or a lithium battery, a secondary battery such as NiCd battery, an NiMH battery, an Li battery, or an AC adaptor.

The digital still camera also has an interface 90 with a recording medium, such as a memory card or a hard disk, a connector 92 for connection with a recording medium such as a memory card or a hard disk, and a recording-medium detector 98 for detecting whether the card-shaped recording medium 6 is connected to the connector 92.

The optical finder 3 allows imaging by itself without using the electronic finder function of the image display section 28. Furthermore, part of the functionality of the display unit 54 is implemented within the optical finder 3, for example, a display relating to focusing, camera-shake alert, flash charging, shutter speed, aperture value, and exposure correction.

The communication unit 110 is capable of various types of communications, such as RS232C, USB, IEEE1394, P1284, SCSI, modem, LAN, and wireless communication.

A connector 112 allows the imaging apparatus 100 to be connected to another apparatus via the communication unit 110. The connector 112 is replaced by an antenna in the case of wireless communication.

Next, an operation in the playback mode will be described with reference to FIG. 6.

When the playback mode is entered using the mode dial 60, in step S101, the system controller circuit 50 accesses the non-volatile memory 56 to check whether a sample-image-reference-mode flag is set.

If it is determined in step S102 that the sample-image-reference-mode flag is set, in step S103, the non-volatile memory 56 is checked to determine whether the non-volatile memory 56 or the card-shaped recording medium where sample images and a table relating to the sample images are stored is to be accessed first with a priority.

The device to be accessed can be selected using the switches 8. The device to be accessed is the non-volatile memory 56 by default, since the non-volatile memory 56 is provided within the camera and can therefore be accessed in a shorter time.

Selection of the device to be accessed is allowed because, since sample images and a table relating to the sample images can be stored both in the non-volatile memory 56 and the card-shaped recording medium 6, usability is improved by allowing a user to select which of the devices is to be accessed with priority.

For example, if a user often visits mountains using the digital still camera as a picture book, by storing data regarding creatures in the mountains on the non-volatile memory 56 and storing data regarding creatures in the sea on the card-shaped recording medium 6, quick access is achieved in the mountains the user often visits, and search time is reduced by changing the device to be accessed over the sea the user visits only occasionally.

Then, in step S104, the specified device is accessed to determine whether the Table T1 shown in FIG. 5 is present. If it is determined in step S105 that the Table T1 is not present in the specified device, in step S106, a device that has not been specified is accessed. A search miss is prevented whether either of the devices is specified as the device to be accessed.

If it is determined in step S107 the Table T1 is not present in the device accessed next, in step S108, display data showing a message saying "No image" is displayed on the image display unit 28 via the memory controller circuit 22 and the D/A converter 26. Then, the procedure proceeds to step S113, in which the status of the selector switch 10 is checked. On the other hand, if it is determined in step S107 that the Table T1 is present in the device accessed next, the procedure proceeds to step S109. If it is determined in step S105 that the table T1 is present at the specified device, the procedure also proceeds to step S109.

If the Table T1 is present at the device accessed, the Table T1 is loaded in the system controller circuit 50. Since the image with ID 0 is associated with a file cabbagewhite.txt for displaying a title and a file detail_cab.txt for displaying a description in this embodiment, in step S109, these items are displayed on the image display unit 28 via the memory controller circuit 22 and the D/A converter 26.

Then, in step S110, a selection flag indicating that ID 0 is selected is set in the non-volatile memory 56. Each time a sample image is selected again, a selection flag is set to the image selected.

Based on the setting of a selection flag, in step S110, the system controller circuit 50 accesses the non-volatile memory 56 to check the selection flag so that a sample image having an ID with the flag set in the Table T1 can be displayed as a subscreen in a part of the image display section 28, and a directory for saving can be determined. This operation will be described below in detail.

Then, in step S111, it is determined whether any of the operation switches 8 has been pressed. If any of the operation switches has been pressed, in step S112, an operation assigned to the switch is performed. The procedure then returns to step S109. For example, in this embodiment, the setting for displaying images is such that a sample image and a title thereof are displayed, as in the image 11 shown in FIG. 2. When an information display button included in the operation switches 8 is pressed, an image is reduced and a description associated therewith in the Table T1 is displayed, as shown in FIG. 8.

This operation allows the user to find an image of an object and then read more detailed description using the digital still camera as if the user is using a picture book. Furthermore, since the functions of moving forward or backward through images are assigned to the operation switches 8, images having ID 1 and ID 2 in the Table T1 can be sequentially displayed. Although images with IDs up to ID 2 are shown in Table 1, obviously, the number of images can be increased or decreased as desired.

After a selection flag is set, if it is determined in step S111 that none of the operation switches 8 has been pressed, it is determined in step S113 whether the selector switch 10 has been pressed. If the selector switch 10 has been pressed, the sample-image-reference-mode flag is cleared in step S114. The procedure then returns to step S101. If it is determined in step S113 that the selector switch 10 has not been pressed, the setting of the mode dial is checked.

If it is determined in step S102 that the sample-image-reference-mode flag has not been set, in step S115, the normal playback mode in entered and the card-shaped recording medium 6 is accessed. If it is determined in step S116 that a recorded image is not present in the card-shaped recording medium 6, in step S117, display data including a message saying "No image", stored in the non-volatile memory 56, is displayed on the image display unit 28 via the memory controller circuit 22 and the D/A converter 26. Then, in step S121, the status of the selector switch 10 is checked.

If it is determined in step S116 that a recorded image is present in the card-shaped recording medium 6, in step S118, the image is displayed on the image display unit 28 via the memory controller circuit 22 and the D/A converter 26.

Then, in step S119, it is determined whether any of the operation switches 8 has been pressed. If any of the operation switches 8 has been pressed, in step S120, an operation assigned to the switch is performed. Then, in step S118, the recorded image on the card-shaped recording medium 6 is displayed on the image display unit 28. If it is determined in step S119 that none of the operation switches 8 has been pressed, it is determined in step S121 whether the selector switch 10 has been pressed. If the selector switch 10 has been pressed, in step S122, the sample-image-reference-mode flag is set. The procedure then returns to step S101. If it is determined in step S121 that the selector switch 10 has not been pressed, the setting of the mode dial is checked.

Next, an operation in the imaging mode will be described with reference to FIG. 7.

When the imaging mode is entered using the mode dial 60, in step S201, the system controller circuit 50 accesses the non-volatile memory 56 to determine whether the sample-image-reference-mode flag is set.

If it is determined in step S202 that the sample-image-reference-mode flag is set, in step S203, it is determined whether the non-volatile memory 56 or the card-shaped recording medium 6 where sample images and a table for managing the sample images are stored to be accessed first with a priority.

A device to be accessed can be selected using the operation switches 8. The device to be accessed is the non-volatile memory 56 by default since the non-volatile memory 56 is provided within the camera and can therefore be accessed in a shorter time.

Then, in step S204, the specified device is accessed to check whether Table T1 shown in FIG. 5 is present therein. If it is determined in step S205 that the Table T1 is not present in the specified device, in step S206, a device that has not been selected is accessed next.

If it is determined in step S207 that Table T1 is not present in the device accessed next, in step S208, display data including a message saying "No sample image", stored in the non-volatile memory 56, is displayed on the image display unit 28 via the memory controller circuit 22 and the D/A converter 26. The procedure then proceeds to step S222. If it is determined in step S207 that Table T1 is present in the device accessed next, the procedure proceeds to step S209.

If it is determined in step S205 that Table T1 is present in the specified device, the procedure also proceeds to step S209. In step S209, the Table T1 is loaded into the system controller circuit 50, and it is checked whether the selection flag, described in relation to the playback mode, is set.

If it is determined in step S209 that the selection flag is not set, in step S210, an image having an ID number of 0 in Table T1 is displayed as a subscreen in a part of the image display unit 28 via the compander circuit 32, the memory controller circuit 22, and the D/A converter 26. The procedure then proceeds to step S212.

If it is determined in step S209 that the selection flag is set, in step S211, an image with the flag set is displayed as a subscreen in a part of the image display unit 28 via the compander circuit 32, the memory controller circuit 22, and the D/A converter 26. The procedure then proceeds to step S212.

An image last displayed in step S211 in the playback mode is automatically displayed in a subscreen during imaging. Accordingly, the user is allowed to recognize what the sample image displayed in the playback mode relates to, and to compare an object to be imaged with the sample image.

In step S212, a directory associated in Table T1 with the sample image is set as a directory where the image is to be saved. In this embodiment, the captured image is saved in the directory where the sample image is stored, as shown in FIG. 3. Alternatively, however, since the image is associated by a table with a directory where the image is saved, a directory that is different from a directory where the sample image is stored may be specified as a directory where the image is to be saved.

Then, in step S213, the system controller circuit 50 controls the exposure controller 40, the ranging controller 42, the zoom controller 44, the flash 48, and the like, of the imaging apparatus 100 to change imaging conditions according to an imaging condition cond_cabl.txt associated in the Table T1 with the image to be captured. Imaging conditions prepared in advance specify recommended optimal values for imaging an object so that even a novice or a child can readily take a clear picture of the object without failure. The recommended optimal imaging conditions may indicate values of setting of the digital still camera at the time when the sample image was taken, or corrected values of the setting of the digital still camera at the time when the sample image was taken.

In step S214, the image display unit 28 sequentially displays captured image data in addition to the subscreen. In this "through display" status, data sequentially written to the video memory 24 via the imaging device 17, the A/D converter 18, the image processing circuit 20, and the memory controller circuit 22 is sequentially displayed on the image display unit 28 via the memory controller circuit 22 and the D/A converter 26, whereby the function of an electronic finder is provided. Thus, the user is allowed to check whether the object to be imaged matches the sample image.

For example, if the object does not match the sample image, the operation switches 8 are used in step S215 to move forward or backward through sample images in step S216. The procedure then returns to step S209. In accordance with the forward or backward movement through the sample images, the setting of the selection flag changes. Thus, the system controller circuit 50 checks the selection flag in step S209, and displays an image with the flag set in a subscreen in step S211.

If it is determined in step S215 that none of the operation switches 8 has been pressed, it is determined in step S217 whether the selector switch 10 has been pressed. If the selector switch 10 has been pressed, in step S218, the sample-image-reference-mode flag is cleared. The procedure then returns to step S201. This routine is used, for example, when the user wishes to abruptly switch to normal imaging mode for imaging a person while trying to image a cabbage white as an object.

If it is determined in step S217 that the selector switch 10 has not been pressed, it is determined in step S219 whether the shutter button has been pressed. If it is determined in step S219 that the shutter button has been pressed, in step S220, the object is imaged under the imaging conditions specified in Table T1, and captured image data is written in the memory 30.

The system controller circuit 50 reads the captured image data written to the memory 30. The system controller circuit 50 executes various image processing using the memory controller circuit 22 and the image processing circuit 20, as required, and executes image compression using the compander circuit 32 in accordance with a mode set. Then, in step S221, the system controller circuit 50 performs a recording process for writing the resulting image data in a directory of the card-shaped recording medium 6, associated with the image data in Table T1.

That is, according to this embodiment, the captured image is recorded in the same directory as the image displayed in the subscreen on the image display unit 28, so that images can be organized simultaneously with imaging.

Then, if it is determined in step S222 that the selector switch 10 has been pressed, in step S218, the sample-image-reference-mode flag is cleared. The procedure then returns to step S201. If it is determined in step S222 that the selector switch 10 has not been pressed, the setting of the mode dial 60 is checked.

If it is determined in step S202 that the sample-image-reference-mode flag is not set, the system controller circuit 50 accesses the non-volatile memory 56 to check an image-display ON/OFF flag. If it is determined in step S223 that the image-display ON/OFF flag is not set, image display is turned off in step S224. The procedure then proceeds to step S226.

This is an imaging state where an optical finder is used for the purpose of saving power consumption. If it is determined in step S223 that the image-display ON/OFF flag is set in the non-volatile memory 56, in step S225, the image display unit 28 performs "through display".

If the user presses one of the operation switches 8 to perform another operation in step S226, processing in accordance with the button selected is executed in step S227. The procedure then returns to step S226.

If it is determined in step S226 that none of the operation switches has been pressed, it is determined in step S228 whether the selector switch 10 has been pressed. If the selector switch 10 has been pressed, in step S229, the sample-image-reference-mode flag is set. The procedure then returns to step S201. This routine is used, for example, when the user wishes to abruptly enter the sample-image-reference mode to image a cabbage white or the like while trying to image a person.

If it is determined in step S228 that the selector switch 10 has not been pressed, it is determined in step S230 whether the shutter button has been pressed. If the shutter button has not been pressed, the procedure returns to step S226. If it is determined in step S230 that the shutter button has been pressed, in step S231, imaging is performed under specified conditions, and image data captured is written to the memory 30.

The system controller circuit 50 reads the captured image data written to the memory 30. The system controller circuit 50 executes various image processing using the memory controller circuit 22 and the image processing circuit 20, as required, and executes image compression using the compander circuit 32 in accordance with a mode set. Then, in step S232, the system controller circuit 50 performs a recording process for writing the resulting image data in a directory of the card-shaped recording medium 6 that is different from the directory where the sample image is stored.

Then, if it is determined in step S233 that the selector switch 10 has been pressed, in step S229, the sample-image-reference-mode flag is set. The procedure then proceeds to step S201. If it is determined in step S233 that the selector switch 10 has not been pressed, the setting of the mode dial 60 is checked.

Although the present invention has been described in the context of the embodiments herein, the number of imaging conditions included in Table T1 may be only one or more than one. Furthermore, more than one subscreen may be displayed on the image display unit 28. For example, a plurality of imaging conditions described earlier may be displayed in subscreens so that the user is allowed to select imaging conditions.

In the embodiments described above, in Table T1, a directory in which an image is to be save is associated with a sample image. Alternatively, instead of defining the association in Table T1, for example, a new-directory creating button may be provided on the main unit of the camera so that a captured image can be saved in a new directory associated with a sample image when the creating button is pressed with the sample image being displayed in a subscreen.

That is, methods of creating a directory associated with a sample image are not limited to those employed in the embodiments described above, and a gist of the present invention lies in creating a directory associated with a sample image.

As described hereinabove, a directory where an image captured is to be saved is displayed on a liquid crystal panel during imaging. Thus, a user is allowed to know where an image will be saved while imaging an object. Furthermore, a captured image can be saved in a directory where an associated sample image is stored. Accordingly, a new way of enjoying an digital still camera is provided; for example, a user looks up an object using a CF (CompactFlash™) card storing a picture book, and images the object under imaging conditions that are determined in advance by a professional and automatically set in the camera, so that even a novice is readily allowed to image an object.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging apparatus comprising:
   an optical imaging unit that converts a currently viewed object image into object image data;
   a storage medium that stores sample image data corresponding to a plurality of sample images;
   an operating member that selects one of the plurality of sample images;
   a monitor that displays the currently viewed object image and the sample image based on the object image data and the sample image data, said monitor simultaneously displaying the sample image selected by said operating member and the currently viewed object image corresponding to the object image data, wherein said object image data is not yet stored on said storage medium;
   a switch that instructs the imaging apparatus to store the object image data obtained by said imaging unit on said storage medium that corresponds to the object image displayed by the monitor; and
   a control circuit that saves, in said storage medium, the object image data such that the object image data is associated with the sample image simultaneously displayed on said monitor with the currently viewed object image according to an operation of said switch.

2. An imaging apparatus according to claim 1, further comprising a second storage medium that stores object image data, wherein said control circuit saves in said second storage medium the object image data such that the object image data is associated with the sample image displayed on said monitor according to the operation of said switch.

3. An imaging apparatus according to claim 1, wherein said storage medium stores additional data associated with each of the plurality of sample images, the additional data including respective imaging conditions suitable for capturing the plurality of sample images.

4. An imaging apparatus according to claim 3, wherein said control circuit controls an image capture operation of said optical imaging unit in accordance with the imaging condition included in the additional data associated with the sample image simultaneously displayed therewith on said monitor.

5. An imaging apparatus according to claim 1, further comprising:
   a reader that reads sample image data corresponding to a sample image from an external storage medium; and
   a selector that selects whether said control circuit controls operation of said imaging apparatus so as to display on said monitor the sample image read from said external storage medium or one of the plurality of sample images from said storage medium.

6. An imaging apparatus comprising:
   an optical imaging unit that converts a currently viewed object image into object image data;
   a reader that reads sample image data corresponding to a plurality of sample images from an external storage medium;
   an operating member that selects one of the plurality of sample images;
   a monitor that displays the currently viewed object image and the sample image based on the object image data and the sample image data, the monitor simultaneously displaying the sample image selected by said operating member and the currently viewed object image corresponding to the object image data, wherein said object image data is not yet stored on said external storage medium;
   a switch that instructs to store the object image data obtained by said imaging unit on said external storage medium that corresponds to the object image displayed by the monitor; and
   a control circuit that saves, in said external storage medium, the object image data such that the object image data is associated with the sample image simultaneously displayed on said monitor with the currently viewed object image according to an operation of said switch.

7. An imaging apparatus according to claim 6, wherein said reader is capable of writing data to said external storage medium, and wherein said control circuit controls said reader so as to save in the external storage medium object image data such that the object image data is associated with the sample image displayed on said monitor according to the operation of said switch.

8. An imaging apparatus according to claim 6, further comprising a second storage medium that stores object image data, wherein said control circuit saves in said second storage medium the object image data such that the object image data is associated with the sample image displayed on said monitor according to the operation of said switch.

9. An imaging apparatus according to claim 6, wherein said reader reads additional data associated with the sample image, the additional data including an imaging condition suitable for capturing the sample image.

10. An imaging apparatus according to claim 9, wherein said control circuit controls an image capture operation of said optical imaging unit in accordance with the imaging condition included in the additional data.

11. An imaging apparatus according to claim 6, wherein said reader reads sample image data corresponding to a plurality of sample images from said external storage medium, and further reads additional data associated with the plurality of sample images, the additional data including respective imaging conditions suitable for capturing the plurality of sample images.

12. An imaging apparatus according to claim 11, wherein said control circuit controls operation of said imaging apparatus so as to simultaneously display on said monitor the object image and one of the plurality of sample images, and controls an image capture operation of said optical imaging unit in accordance with the image condition included in the additional data associated with the sample image simultaneously displayed on said monitor.

13. A method of controlling an imaging apparatus, the method comprising:
   converting a currently viewed object image captured by an optical imaging unit into object image data;
   reading from an external storage medium sample image data corresponding to a plurality of sample images;
   selecting with an operating member one of the plurality of sample images;
   displaying on a monitor the currently viewed object image and the sample image based on the object image data and the sample image data, the monitor simultaneously displaying the sample image selected in said selecting step and the currently viewed object image corresponding to the object image data, wherein said object image data is not yet stored on said external storage medium;

instructing with a switch to store the object image data obtained by the imaging unit on the external storage medium that corresponds to the object image displayed by the monitor; and saving, in the external storage medium, the object image data such that the object image data is associated with the sample image simultaneously displayed on the monitor with the currently viewed object image according to said instructing step.

14. A method of controlling an imaging apparatus according to claim 13, further comprising reading additional data from the storage medium, the additional data including an imaging condition associated with the sample image read from the storage medium, and controlling an image capture operation of the optical imaging unit based on the additional data.

15. A method of controlling an imaging apparatus according to claim 13, further comprising reading a sample image from among a plurality of sample images stored in a plurality of storage media.

* * * * *